United States Patent Office 3,461,875
Patented Aug. 19, 1969

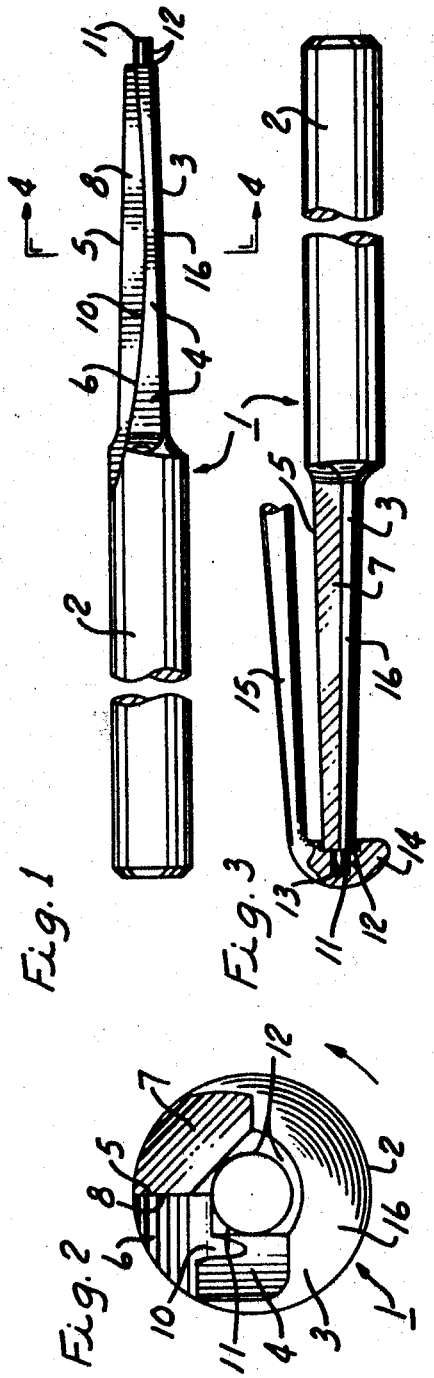

3,461,875
ROTARY LATERAL OSTEAL CUTTING BIT
Robert M. Hall, 103 Hillcrest Road, Fox Chapel,
Pittsburgh, Pa. 15238
Filed Apr. 27, 1966, Ser. No. 545,634
Int. Cl. A61b 17/16
U.S. Cl. 128—310                                9 Claims

ABSTRACT OF THE DISCLOSURE

A rotary osteal saw cutting bit having a shank and a body provided with a straight longitudinally tapered flute having an axially radial flat face and a tapered flat face both of which are intersected by a coextensive curved face normal to each of said flat faces, a second tapered flat face intersecting longtudinally said axially radial flat face to form a straight tapered cutting blade, the other of said edges of said first and second tapered flat faces joined by a tapered arcuate surface, and a bearing surface beyond the tip of said cutting blade.

---

The invention relates generally to rotary cutting bits and more particularly to improvements in rotary lateral cutting bits.

This invention will be described in connection with rotary side cutting of bone in surgery such as in a craniotomy wherein a portion of the skull is removed.

Heretofore, the structural characteristics of rotary lateral cutting bits have proved to be relatively dangerous in surgery. This is due to the extensive heat, friction, stress, bit breakage, poor removal of cut bone particles and the jamming of cut particles between the bit and the bone being drilled. It is extremely necessary that the bone being cut is no overheated by friction which would result in the dying of the affected bone cells. For lateral cutting of bone at high speeds, a single straight flute and cutting edge have thus far proved to be the most effective. This is because only one protruding cutting edge cuts the bone upon each 360° revolution of the drill. Thus, less friction per revolution is applied to the cutting area and therefore less heat is transferred to the bone than would be the case with multiple and helical flutes and cutting edges. Even though only one cut is made per revolution, the cutting process is not slow as the drill is rotating the bit 1 from 16,000 to 20,000 revolutions per minute. However, as the vertically positioned rotating cutting bit is urged laterally to cut bone, a very large portion of the 360° revolving surface of the bit is rubbing against the bone area being cut between each 360° revolution of the cutting edge. In other words in each 360° revolution of the bit only one cut is made in the lateral direction the bit is being urged, but between each successive cut a large area of drill surface is rubbing against area being cut. The result is that excess friction and heat are created which may kill the living bone tissue resulting in severe injury to the patient. Bone particles being cut away are jammed between the bit and bone area being cut resulting in increased friction in the cutting area, poor visibility of the specific cutting task being accomplished, an increased hazard of breaking the bit and a longer required time to cut the desired portion of bone.

The principal object of the present invention is to provide a rotary lateral cutting bit which minimizes the above named disadvantages.

Another object of the present invention is to provide a lateral cutting rotary bit which has a minimum of friction surface to engage the surface being cut yet retaining maximum strength thus minimizing heat, friction and breakage.

Another object is to provide a single straight cutting edge which will cut faster than the rotary lateral cutting bits heretofore known, and at the same time produce less friction and heat.

Another object is to provide a combination of the bit of the present invention with a support means at its outer tip end to prevent the bit from cantilever whipping at high revolutions, to reduce possibility of breaking due to excess drilling pressure, to cover the tip end and to act as a vertical stop to feel the inner surface of the bone being cut in order to prevent injury to the soft tissues lying under the bone being cut.

A more specific object is to strengthen the outer end of the bit to prevent breakage about the tip end support bearing of the bit. This is accomplished by gradually decreasing the depth of the flute as it approaches the outer end where it is supported by a support outboard bearing means.

Other objects and advantages of this invention appear hereinafter in the following description and claims.

The accompanying drawings show for the purpose of exemplification without limiting this invention or the claims thereto, certain practical embodiments illustrating the principles of this invention wherein:

FIG. 1 is a view in side elevation illustrating a practical embodiment of the present invention.

FIG. 2 is an enlarged front view illustrating the cutting bit shown in FIG. 1.

FIG. 3 is a view in side elevation illustrating the reverse side of the cutting bit shown in FIG. 1.

FIG. 4 is an enlarged rear view of the cutting bit shown in FIG. 1 in cross section taken along line 4—4 of FIG. 1.

Referring to FIGS. 1, 2, 3 and 4, the bit 1 is provided with a cylindrical shank section 2 and a substantially frusto conical cutting body 3. The body 3 has a leading relief 4 which is shown here as a flat face axially aligned surface as though a longitudinal slice was removed from the body 3. The straight cutting edge 5 is defined on one side by the trailing flat face relief 7 and on the other side by the radially disposed leading face 8. The trailing flat face relief 7 is similar in shape to the leading flat face relief 4 in that it can be described as what remains when an axial tapered slice is removed from the body 3. Thus, any transverse line on the trailing flat face relief 7 can be defined as a surface having a cross section represented by a chord of the cutting circle subscribed by the blade or edge. The flute 6 is formed by the flat forward face 8 which is radial to the rotary axis as shown in FIGS. 1, 2 and 4 and the concave face 10 which is made concave in order to increase the strength of the bit and is normal to the face 8 as shown in these views. The outer end of the bit 1 is provided with a cylindrical extension 11 which provides the bearing surfaces 12.

When the bit 1 is in use, the extension 11 is inserted in an outboard bearing recess 13 in the boss 14 which is part of the strut 15. The shank 2 is inserted in the drill spindle (not shown) and the strut 15 is secured to the drill housing (not shown) which houses the motor to drive the drill. Thus, the strut 15 acts as a stationary support member for the outer end 11 of the bit 1. This support means is a necessity in bone surgery in order to keep the rotating bit 1 from whipping when under pressure and thereby breaking or otherwise causing injury. The boss 14 not only provides the bearing recess 13 but also covers the outer end of the bit 1 and provides a vertical stop to feel the inner surface of the bone thereby protecting the soft tissue lying under the bone while the bit 1 is making a lateral cut.

As shown, the flat face reliefs 4 and 7 together with the other faces making up the flute 6, all provide relief leaving only the cutting edge and the remaining frusto conical surface 16 of body 3 to engage the material being cut when the bit 1 is rotating at high speeds. Thus, the only areas of the bit 1 creating friction with the material being cut are the cutting edge 5 itself and the small frusto conical surface 16 which creates materially less friction than the cutting action and literally positions the cutting edge for the next cutting revolution.

The flute 6 and the relief surfaces 4 and 7 provide the maximum surface area which may be removed from body 3 without unduly weakening the strength of the bit 1 and still maintaining a smooth cutting action without a jarring motion or dangerous vibration. If the relief surfaces 4 and 7 were cut any deeper so as to undermine the extended bearing 11, the bit would be unusable and unsafe for two reasons: first, as lateral pressure is applied to the bit 1 while it is supported in the boss 14 the body 3 would tend to break just above the extension 11 where it was undercut; secondly, if too much of the circular sections of the frusto conical surface 16 is removed, the purpose is defeated, that is, if too much of the surface 16 is removed, then the reliefs do not function as reliefs as the cutting pressure will not only bear on surface 16 and cutting edge 5 but will also bear longer on the relief surfaces if they are too large. This would also result in increased vibration because of the ununiform surfaces rubbing successively over the material being cut.

The flat face relief 7 not only functions as a relief but also forms the trailing blade face for the cutting edge 5. If the flat face relief 7 were not employed, the cutting edge 5 would have two right angle blade faces. Therefore, as the bit 1 is rotated in the counterclockwise direction as indicated by the arrow in FIG. 2, the edge 5 would also have a rubbing action rather than a cutting action resulting in more friction and a smaller cut. However, the bit of the present invention provides the cutting edge 5 in the form of a chisel blade. Thus, the blade cuts deeper into the bone on each stroke without increasing the friction. Therefore, the cutting process is faster with less friction and heat over the same length of cutting path.

These combined effects of the relief 7 provide a lateral cutting bit with minimum friction and heat, adequate strength and fast cutting. These qualities or characteristics are absolutely essential in delicate bone surgery such as a craniotomy. With these characteristics the bit 1 reduces operative time, appreciably reduces trauma, and minimizes anesthesia while creating a minimum of friction and heat. The reliefs 4 and 7 and the flute 6 provide ample room to remove the cut bone particles so that they do not jam between the bit and the area being cut and thereby increase the friction.

I claim:

1. A rotary lateral osteal cutting bit, comprising a blade, a leading relief a single flute one face of which is flat and radial to the rotary axis of said bit and forms the leading face of said cutting blade, said flute having a second face normal to said leading flat face, a trailing relief in the form of a straight flat face that also forms said cutting blade by its juncture with said radial flat face at an acute angle.

2. The rotary lateral osteal cutting bit of claim 1 characterized in that said trailing relief face is a flat transverse surface representing, in cross section, a cord of the cutting circle subscribed by said cutting blade.

3. The rotary lateral osteal cutting bit of claim 1 characterized by a cylindrical extension at its outer end to be mounted in a recess thereby providing an outboard bearing to support the same.

4. The rotary lateral osteal cutting bit of claim 3 characterized in that said leading flute relief and trailing relief, provide means producing maximum surface relief on said blade without weakening said support extension.

5. A rotary lateral osteal cutting bit and support member, comprising a bit shank section, a cutting body extending from said shank, a single straight flute in said body having a leading flat face forming one side of a cutting blade, a trailing flat face relief forming the other side and trailing face of said cutting blade, a bearing surface on the tip end of said bit, a strut spaced longitudinally alongside said bit, a boss on said strut adjacent the tip end of said bit, a bearing recess in said boss receiving said tip bearing surface on the outer end of said bit.

6. A rotary lateral osteal cutting bit, consisting of a cylindrical shank section having a rotary central axis, a substantially frusto conical cutting body extending from said shank section and having its axis aligned with the rotary axis of said shank section, a single axially aligned flute on said body, a single axially aligned cutting edge having its leading face formed by an axially aligned radial flat face of said flute, an axially extended trailing flat face relief on said cutting body forming the trailing cutting edge that constitutes the trailing blade face of said cutting edge.

7. The rotary lateral osteal cutting bit of claim 1 further characterized by said leading flat face spaced from said rotary axis and joining and normal to said second flute face.

8. The rotary lateral osteal cutting bit of claim 1 characterized by a concavity in said second flute face, said concavity extending to the rotary axis intermediate the ends of said second flute face and cutting edge.

9. A rotary osteal saw cutting bit comprising a shank and a body extending from said shank and provided with a straight longitudinally tapered flute having an axially extending radial flat face and a tapered flat face both of which are joined by a coextensive curved face normal to each of said flat faces, a second flat face joining longitudinally said axially extending radial flat face to form a straight tapered cutting blade, the other of said edges of said first and second flat faces joined by an arcuate surface, and a bearing surface beyond the tip of said cutting blade.

References Cited

UNITED STATES PATENTS

| | | | |
|---|---|---|---|
| 1,781,564 | 11/1930 | Beattie | 128—310 |
| 1,923,177 | 8/1933 | Tucker. | |
| 2,490,878 | 12/1949 | Marsh | 30—276 |
| 3,223,088 | 12/1965 | Barber et al. | 128—310 |
| 3,308,828 | 3/1967 | Pippin | 128—310 |

L. W. TRAPP, Primary Examiner